3,752,741
EXTRACTION OF PROTEASES

Monique Courtois, 5 Rue Auguste Barbier, Paris, France, and Bernard Ores, 13 Rue Bataille, Montreuil Sous Bois, France
No Drawing. Filed May 24, 1971, Ser. No. 146,550
Claims priority, application France, June 3, 1970, 7020365
Int. Cl. C07g 7/028
U.S. Cl. 195—66 R            5 Claims

ABSTRACT OF THE DISCLOSURE

A novel process for the extraction of proteases active in alkaline medium from fermentation broths in which the proteases are produced by microorganisms, by adsorption on a non-ionic resin and elution with a solvent.

STATE OF THE ART

Certain microorganisms such as *Bacillus subtilis* are known to be capable of producing proteases active in alkaline medium by fermentation. Many procedures for the extraction of the proteases have been described. One example consists of, after fermentation, eliminating the insoluble elements in the medium by centrifugation or filtration and then after clarification, the proteases are salted out with mineral salts or precipitated with an organic solvent. The search for a more perfect process of extraction continues, mainly to obtain a selective isolation of the proteases with a high purity.

OBJECTS OF THE INVENTION

It is an object of the invention to provide a novel process for the extraction of proteases active in alkaline medium from fermentation broths in high quality.

It is another object of the invention to provide a process for extracting proteases active in alkaline medium from fermentation broths with a high yield.

These and other objects and advantages of the invention will become obvious from the following detailed description.

THE INVENTION

The novel process of the invention for the extraction of proteases active in alkaline medium from a fermentation broth comprises adding after fermentation is completed a non-ionic adsorbant resin having a very large specific surface to the fermentation broth, leaving the resin in contact with the entire broth for 2 to 20 hours, separating the resin from the fermentation broth, eluting the resin with an aqueous alcohol buffered at a pH of 9 to 11 and containing 5 to 20% of an alkanol of 1 to 3 carbon atoms and extracting proteases from the eluate by known means.

The term nonionic resin is intended to mean resins of a polymer having a three dimensional skeleton and containing no functional groups. Resins with a large specific surface are resins having a specific surface of at least 250 m.$^2$ per gram of resin.

The low molecular weight alkanols used for eluting the resin are alkanols of 1 to 3 carbon atoms such as methanol, ethanol, isopropanol, etc.

The starting fermentation broth containing the active proteases can be obtained by the known production procedures.

In putting the extraction process of the invention into use, the resin used preferably has a macrolattice and is porous with pores having a diameter of 50 A. to 250 A. and whose adsorbant surface is of the order of 250 to 1000 m.$^2$ per gram. One such resin can be an acrylic resin such the commercial resin sold under the mark Amberlite XAD-7 whose pores have a diameter of about 87 A. and whose specific surface is about 445 m.$^2$ per gram.

In general practice, 100 to 500 ml. of the resin per liter of fermentation broth to be treated are added in one or several times. Generally, the resin is left in contact with the fermentation broth for 2 to 15 hours to ensure good adsorption of the proteases on the resin. The resin can then be isolated from the whole fermentation broth by the use of a simple screening.

The resin is most advantageously placed in a column and eluted with aqueous alcohol buffered at a pH of 10.5+0.1 and containing 5 to 10% of methanol, the volume of solution being 3 to 5 times that of the resin used. The eluate is then recovered and the methanol is eliminated by concentration in vacuo to obtain an aqueous solution from which the proteases can be isolated by known means such as atomization, lyophilization, precipitation or salting out.

It has been shown that the proteases is recovered from the fermentation broth in a yield of 70 to 90%. Thus, the problems of mineral salts in waste waters for salting out of the prior art is avoided and the products obtained are more pure and have better organoleptic properties such as color or odor.

In the following examples there are described several preferred embodiments to illustrate the invention. However, it should be understood that the invention is not intended to be limited to the specific embodiments.

Example I

A strain of *Bacillus subtilis* capable of producing proteases active in alkaline medium was aerobically fermented in an appropriate nutritive media for 36 hours at 33° C. Then, 90 ml. of a non-ionic resin (Amberlite XAD-7) was added to 280 ml. of the entire fermentation broth titrating 67.2 proteolytic units per ml. and the mixture was mildly stirred for 15 hours. Then the resin was separated by straining and was then placed in a column and eluted with 270 ml. of a water-alcohol solution buffered at a pH of 10.5 by a 0.05 M sodium bicarbonate solution and containing 10% methanol. The eluate was concentrated under reduced pressure to remove the methanol and then the eluate was lyophilized to obtain 1.2 g. of a product titrating 12,000 proteolytic units per gram for a total yield of 76%.

Example II 500 ml. of fermentation broth were obtained as in Example I and titrated 75 proteolytic units per ml. and after the addition of 140 ml. of Amberlite XAD-7 resin, the mixture was agitated for 12 hours. The resin was separated by straining and was placed in a column and eluted with 400 ml. of the elutant of Example I. The eluate was concentrated under reduced pressure to obtain 60 ml. of a solution titrating about 500 proteolytic units per ml. Protease was precipitated from the solution by addition of 2 volumes (120 ml.) of isopropanol. After drying of the precipitate, 2 gm. of product titrating 15,000 proteolytic units per gm. were obtained for a yield of 80%.

Various modifications of the process of the invention may be made without departing from the spirit or scope thereof and it should be understood that the invention is to be limited only as defined in the appended claims.

We claim:
1. A process for the extraction of alkaline proteases active in medium alkaline from fermentation broths of *Bacillus subtilis* comprising adding after fermentation is completed a non-ionic adsorbant acrylic resin having a macrolattice and pores with a pore diameter of 50 to 250 A. and an adsorbant surface of 250 to 1000 m.$^2$/gm.

to the fermentation broth, leaving the resin in contact with the entire broth for 2 to 20 hours, separating the resin from the fermentation broth, eluting the resin with an aqueous alcohol buffered at a pH of 9 to 11 and containing 5 to 20% of an alkanol of 1 to 3 carbon atoms and extracting proteases from the eluate by known means.

2. The process of claim 1 wherein the resin is left in contact with the broth for 2 to 15 hours.

3. The process of claim 1 wherein the alkanol is 5 to 10% of methanol.

4. The process of claim 3 wherein the pH of the eluate is 10.5.

5. The process of claim 1 wherein the acrylic resin has a pore diameter of about 87 A. and a specific surface of about 445 m.$^2$ per gram.

References Cited
UNITED STATES PATENTS

| | | | |
|---|---|---|---|
| 2,952,586 | 9/1960 | Okunuki et al. | 195—66 R |
| 3,502,545 | 3/1970 | Westman et al. | 195—66 R |
| 3,002,823 | 10/1961 | Flodin et al. | 195—66 R |
| 3,627,640 | 12/1971 | Blumberg et al. | 195—68 |

DAVID M. NAFF, Primary Examiner